United States Patent
Malatesta

(10) Patent No.: US 8,312,516 B1
(45) Date of Patent: Nov. 13, 2012

(54) SECURITY PERMISSIONS WITH DYNAMIC DEFINITION

(75) Inventor: John Malatesta, Alamo, CA (US)

(73) Assignee: Workday, Inc., Pleasanton, CA (US)

( * ) Notice: Subject to any disclaimer, the term of this patent is extended or adjusted under 35 U.S.C. 154(b) by 1200 days.

(21) Appl. No.: 11/471,027

(22) Filed: Jun. 20, 2006

(51) Int. Cl.
*G06F 7/04* (2006.01)
(52) U.S. Cl. .......................................... 726/5; 707/783
(58) Field of Classification Search .................. 726/5, 2, 726/4; 707/9, 781, 783–785
See application file for complete search history.

(56) References Cited

U.S. PATENT DOCUMENTS

| | | | |
|---|---|---|---|
| 7,451,477 B2 * | 11/2008 | Griffin et al. | 726/1 |
| 2004/0243822 A1 * | 12/2004 | Buchholz et al. | 713/200 |
| 2006/0047657 A1 * | 3/2006 | Frieder et al. | 707/9 |

* cited by examiner

*Primary Examiner* — Samson Lemma
(74) *Attorney, Agent, or Firm* — Van Pelt, Yi & James LLP

(57) ABSTRACT

Deriving permissions is disclosed. A request is received from a requestor to perform a database system transaction. One or more permissions associated with the requestor are determined by deriving the one or more permissions based at least in part on database data.

19 Claims, 5 Drawing Sheets

SECURITY PERMISSIONS WITH DYNAMIC DEFINITION

BACKGROUND OF THE INVENTION

Database systems often contain vitally important records for a company. These records can include human resource, corporate, financial, legal, medical, and other records. A person's roles in an organization typically have associated with them security permissions based on the activities the roles require. Roles and responsibilities are typically assigned by the manager(s) for that person. These roles and responsibilities are typically also propagated to other departments/groups within an organization—for example, the human resource department for their records. Security permissions for the roles are usually established at one point in time and assigned to an individual by another individual or department—for example, a system administrator or information technology professional. In some cases, security permissions are determined as part of a process—for example, during the hiring process, permissions are granted based on the position hired for. However, this static and singly targeted strategy for assigning permissions requires active management/coordination between different parts of an organization and as permissions associated with a role or person in an organization change. If there is a lack of coordination, permissions in a database system may be inappropriate for a given person's roles and responsibilities for those roles. It would be beneficial to have system permissions match roles and responsibilities without having to address individually address permission changes associated with each role and/or person.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically defining security permissions is disclosed. A request from a requestor is received to perform a database system transaction. It is determined if the requestor is permitted to perform the database system transaction. In some embodiments, the determination to see if the requestor is permitted to perform the database system transaction is performed in real-time. In some embodiments, security permissions are determined by determining all of the permission types associated with the requestor. Permission types can be determined by using one or more rules, by using one or more rules to examine database data, by using one or more rules to examine database data associated with the requestor where the one or more rules derives roles based at least in part on the database data and wherein the roles have associated permission types, by using one or more rules to examine database data associated with the requestor where the one or more rules derives role permissions based at least in part on the database data, or by any other appropriate way of determining types. In various embodiments, database data comprises human resource data, corporate data, financial data, legal data, medical data, product data, service data, and/or any other appropriate data.

Figure 1:
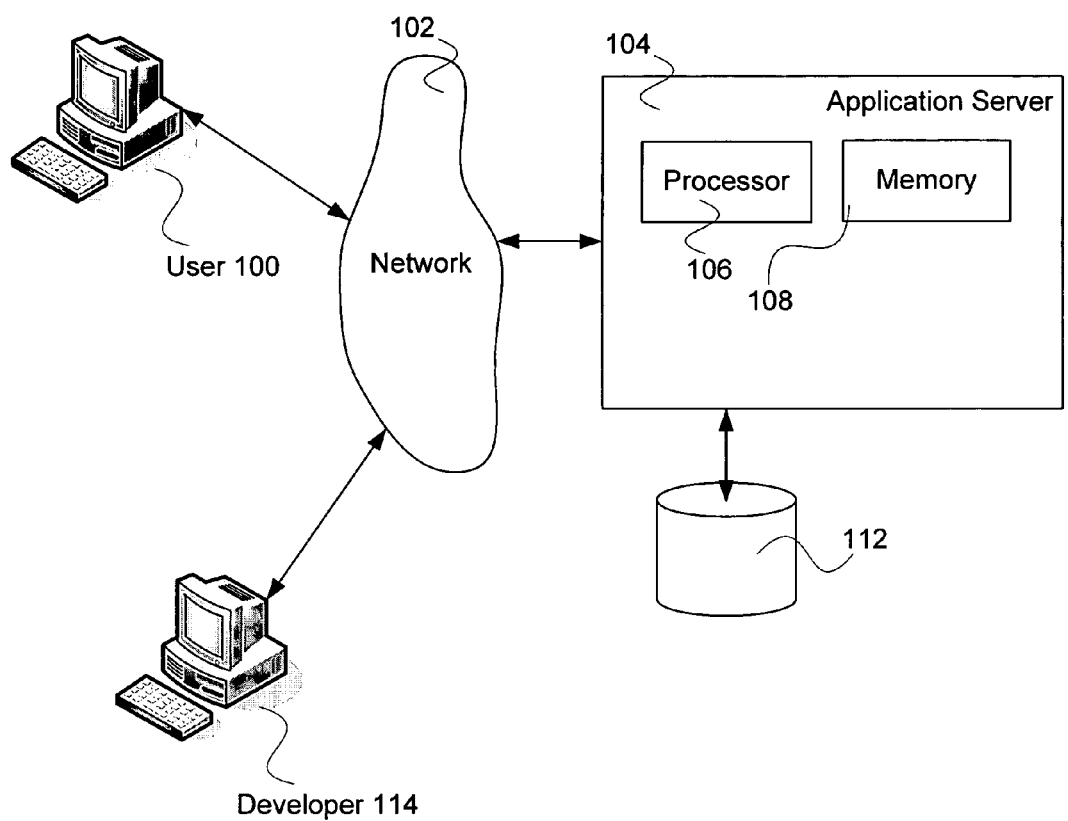
FIG. 1 is a block diagram illustrating an embodiment of a system with dynamically defined security permissions.

FIG. 1 is a block diagram illustrating an embodiment of a system with dynamically defined security permissions. In the example shown, application server 104 includes processor 106, and memory 108. Application server 104 is coupled to external storage 112 so that application server 104 is able to store information to and access information from external storage 112. Application server 104 is also coupled to network 102. In various embodiments, network 102 comprises one or more of the following: a local area network, a wide area network, a wired network, a wireless network, the Internet, or any other appropriate network. Network 102 enables user 100 and developer 114 to access application server 104. In some embodiments, developer 114 specifies an application that runs on application server 104. In some embodiments, the application dynamically derives permissions using one or more rules by deriving the permissions in real-time from database data associated with user 100.

Figure 2:
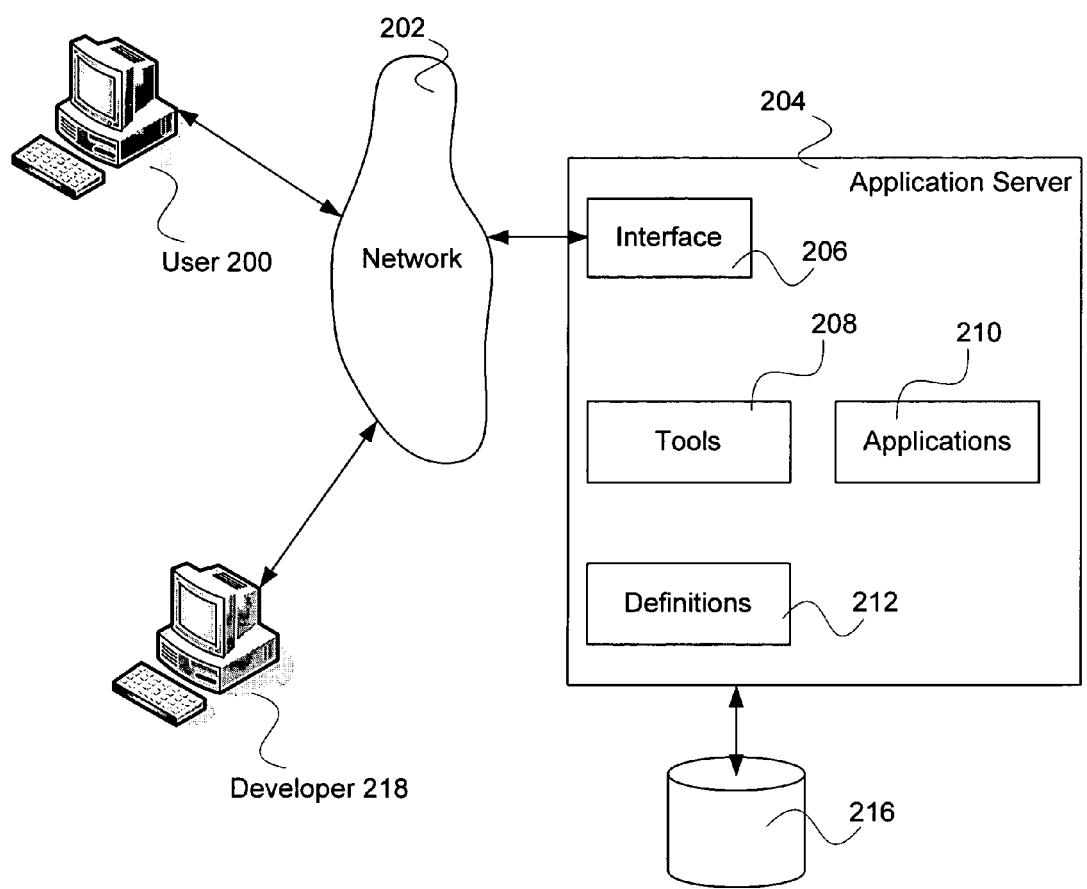
FIG. 2 is a block diagram illustrating an embodiment of a system with dynamically defined security permissions.

FIG. 2 is a block diagram illustrating an embodiment of a system with dynamically defined security permissions. In some embodiments, application server 104 of the system of FIG. 1 and application server 204 of the system of FIG. 2 are the same but viewed from a hardware-oriented and from a software-oriented perspective, respectively. In the example shown, application server 204 includes interface 206, tools 208, applications 210, and definitions 212. Applications 210 are composed of definitions 212 and can be built using tools 208 by developer 218. Definitions 212 include definitions of a class of business objects, of the attributes of the business object, and of the defined relations available to the business object between classes of business objects. User 200 accesses applications 210 via network 202. Application server 204 is coupled to external storage 216 so that application server 204 is able to store information to and access information from external storage 216. Application server 204 is also coupled to network 202. In various embodiments, network 202 comprises one or more of the following: a local area network, a wide area network, a wired network, a wireless network, the Internet, or any other appropriate network. Network 202 enables user 200 and developer 218 to access application server 204.

Figure 3:
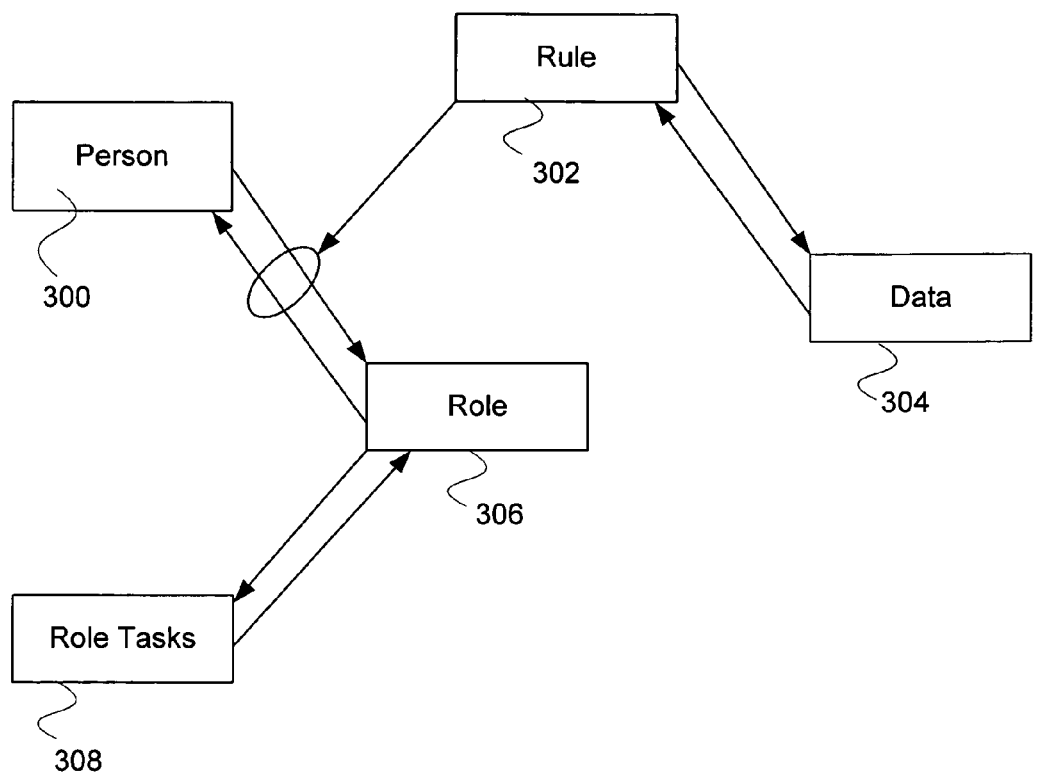
FIG. 3 is a block diagram illustrating an embodiment of objects used to enable dynamically defining security permissions.

FIG. 3 is a block diagram illustrating an embodiment of objects used to enable dynamically defining security permissions. In some embodiments, the objects in FIG. 3 are instantiated in application server 204 during the execution of an application of applications 210. In the example shown, person object 300 comprises a representation of a person—for example, an employee of an organization. Person object 300 is associated with one or more roles, represented in FIG. 3 by role object 306. Role object 302 comprises a role associated with a person object such as person object 300. Roles can include an executive, an officer, a director, a manager, a leader, an assistant, an administrator, a consultant, an employee, a contingent worker, a dependent, a beneficiary, a related person, an external contact, a security administrator, an information technology (IT) support person, a human resource (HR) recruiter, a HR partner, a group leader, facility access, a compensation partner, or any other appropriate role. Roles have associated role tasks 308 which indicate permission types—for example, a leader has for example the following permission types: View Emergency Contacts for Worker, View Organizations I Lead, Create an Open Position. Rule object 302 associates one or more roles (e.g., role 306) with person 300 based at least in part on a data object 306. Data object 306 comprises database data that can be used to derive permission types associated with a user or requestor. In some embodiments, rule object 302 associates role 306 with person 300 based at least in part on database data 304 associated with person 300—for example, if a person that is an employee is associated with an organization and there is data in the database indicating that the person also fulfills the responsibility of leader, the rule will also associated the role leader with this person. The role leader in turn then has the following permission types that are then associated with person 300: View Emergency Contacts for Worker, View Organizations I Lead, Create an Open Position.

In some embodiments, a rule object associates permission types with a role based at least in part on database data associated with a requestor (not shown in FIG. 3)—for example, if an employee is associated with an organization fulfilling the responsibility of leader, a rule will also associate the role leader with this employee. The role leader in turn then has the following permission types that are derived based upon a rule: View Emergency Contacts for Worker, View Organizations I Lead, Create an Open Position.

Figure 4:
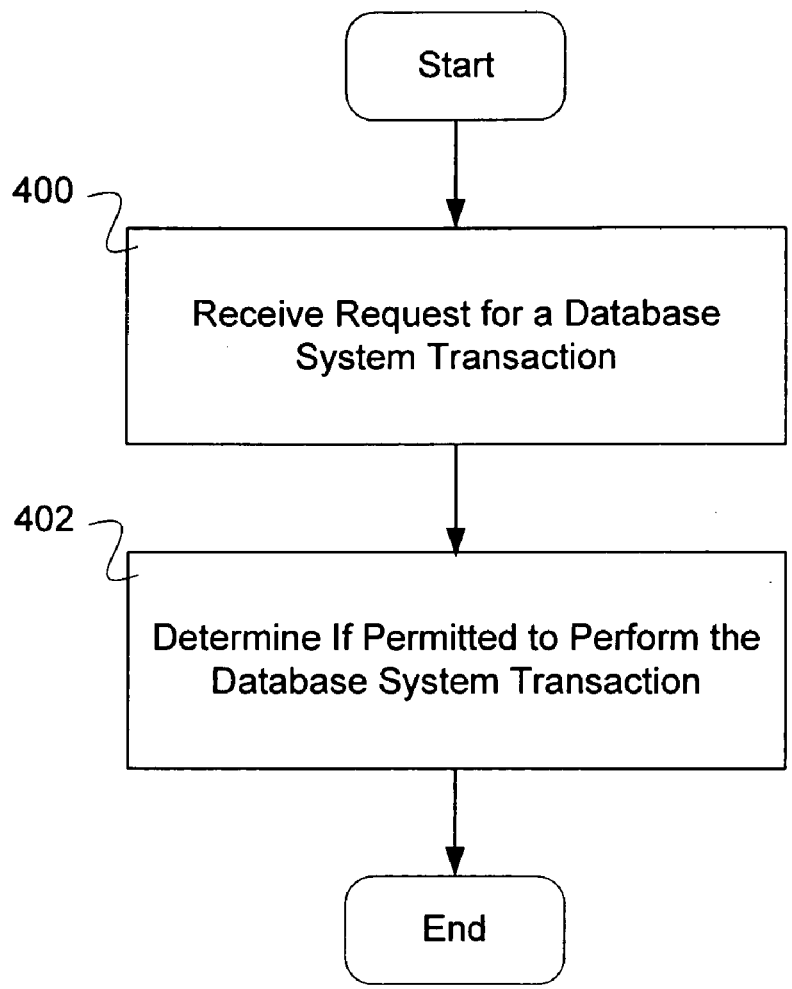
FIG. 4 is a flow diagram illustrating an embodiment of a process for dynamically defining security permissions.

FIG. 4 is a flow diagram illustrating an embodiment of a process for dynamically defining security permissions. In some embodiments, the process of FIG. 4 is executed on processor 106 of FIG. 1. In the example shown, in 400 a request is received for a database system transaction. In various embodiments, the database system transaction comprises logging in to the database system, requesting a menu, requesting an item in a menu, opening a form, completing data in the form, submitting the form, receiving a report as response, responding to a request from a user, or any other appropriate transaction. In 402, it is determined if the requestor is permitted to perform the database system transaction. In some embodiments, all permission types whether directly from roles assigned directly to a person or roles derived from data associated with the requestor are used to determine if the requestor is permitted to perform the database system transaction.

Figure 5:
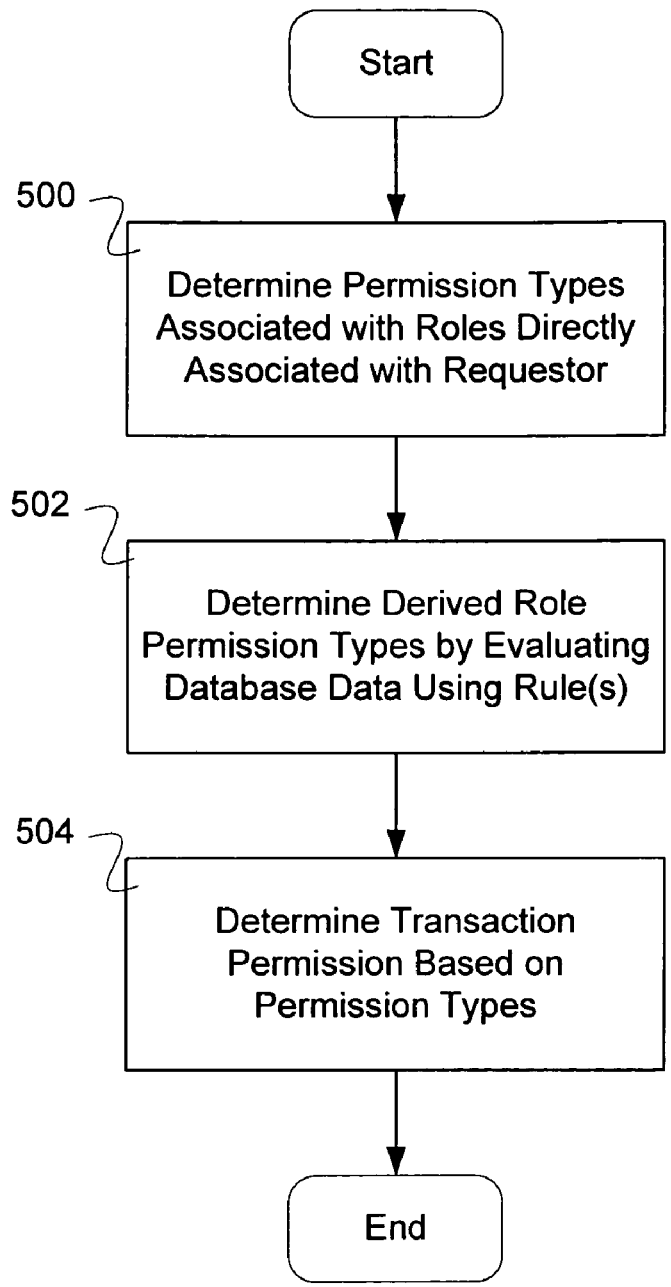
FIG. 5 is a flow diagram illustrating an embodiment of a process for dynamically defining security permissions.

FIG. 5 is a flow diagram illustrating an embodiment of a process for dynamically defining security permissions. In some embodiments, the process of FIG. 5 is used to implement 402 of FIG. 4. In the example shown, in 500 the permission types associated with one or more roles directly associated with a requestor are determined. In 502, derived role permission types are determined by evaluating database data using one or more rules. In some embodiments, a rule comprises determining if a given user is currently assigned a specific role—for example, being a leader of an organization. In 504, transaction permission is determined based on permission types. In some embodiments, if permission is granted for performing the transaction, then the transaction is performed—for example, if the requestor requests a menu, the menu is allowed to appear to the requestor with a list of transactions the user can select.

For example, a person is hired as an employee. The person is entered into the database system indicating that they have been hired as an employee. When that person requests a transaction (e.g., requesting a menu, requesting an item in a menu, etc.), their permission types are checked. Permission types that are derived from being an employee include being able to look at their own pay check information, editing personal data (e.g., home address, phone numbers, emergency contact information, etc.), seeing the company phone directory, seeing the company organization chart, etc.

Next, the person in this example is promoted to being a leader and their status as a leader is added into the database system. When that person requests a transaction (e.g., requesting a menu, requesting an item in a menu, etc.), their permission types are now checked. Permission types that are derived from being an employee are the same as above, but now the person also has permissions derived from having a leader role which may include being able to transfer employees that they are a leader for, promote employees that they are a leader for, hire for empty slots in their group, fire or demote someone in the group, give a raise or bonus, etc.

Next, the person in the example is demoted from having a leader role, and the leader designation is removed from the database system. When that person requests a transaction (e.g., requesting a menu, requesting an item in a menu, etc.), their permission types are checked. Permission types that are derived from being an employee remain, but now the permissions derived from being a leader are removed so that the person can no longer transfer employees that they are a leader for, promote employees that they are a leader for, hire for empty slots in their group, fire or demote someone in the group, give a raise or bonus, etc. The derived permissions provide an efficient way of managing permissions associated with a role instead of with a person, and as roles change the permissions change in step with the roles. In addition, role tasks associated with roles can change (i.e., permission types associated with roles), so that if leaders are now no longer allowed to change salaries or issue bonuses, this can be changed for all leaders by simply altering the role tasks that associate permission types with the leader role. Also, at the next transaction when a request is made to change a salary or bonus by a leader, the request is denied as the permissions are dynamically evaluated at each transaction.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for deriving permissions comprising:
receiving a request from a requestor to perform a database system transaction;
determining, using a processor, a role in real-time associated with the request of the database system transaction using one or more rules based at least in part on database data;
determining one or more permissions associated with the requestor by deriving the one or more permissions based at least in part on the role, wherein determining the one or more permissions includes determining permission types;
determining whether the request includes a request for a menu;
in the event that the request includes the request for the menu, determining a set of allowable transactions available to the requestor based at least in part on the determined permission types; and
displaying the menu and the set of allowable transactions available to the requestor.

2. A method as in claim 1, wherein the database data comprises human resource data.

3. A method as in claim 1, wherein the database data comprises corporate data.

4. A method as in claim 1, wherein the database data comprises financial data.

5. A method as in claim 1, wherein the database data comprises product data.

6. A method as in claim 1, wherein the database data comprises service data.

7. A method as in claim 1, wherein the database data is associated with the requestor.

8. A method as in claim 1, wherein the database data is associated with a role associated with the requestor.

9. A method as in claim 1, wherein the database data is associated with a role associated with the requestor, wherein the role comprises one or more of the following: an executive role, an officer role, a director role, a manager role, a leader role, an assistant role, an administrator role, a consultant role, employee role, contingent worker role, a dependent role, a beneficiary role, a related person role, an external contact role, a security administrator role, an IT support person role, a HR recruiter role, a HR partner role, a group leader role, a facility access role, and a compensation partner role.

10. A computer program product for dynamically defining security permissions, the computer program product being embodied in a non-transitory computer readable medium and comprising computer instructions for:
receiving a request from a requestor to perform a database system transaction;
determining a role in real-time associated with the request of the database system transaction using one or more rules based at least in part on database data;
determining one or more permissions associated with the requestor by deriving the one or more permissions based at least in part on the role, wherein determining the one or more permissions includes determining permission types;
determining whether the request includes a request for a menu;
in the event that the request includes the request for the menu, determining a set of allowable transactions available to the requestor based at least in part on the determined permission types; and
displaying the menu and the set of allowable transactions available to the requestor.

11. A system for dynamically defining security permissions comprising:
a processor;
a memory coupled to the processor, wherein the memory is configured to provide the processor with instructions which when executed cause the processor to:
receive a request from a requestor to perform a database system transaction;
determine a role in real-time associated with the request of the database system transaction using one or more rules based at least in part on database data;
determine one or more permissions associated with the requestor by deriving the one or more permissions based at least in part on the role, wherein determining the one or more permissions includes determining permission types;
determine whether the request includes a request for a menu;
in the event that the request includes the request for the menu, determine a set of allowable transactions available to the requestor based at least in part on the determined permission types; and
display the menu and the set of allowable transactions available to the requestor.

12. A system as in claim 11, wherein the database data comprises human resource data.

13. A system as in claim 11, wherein the database data comprises corporate data.

14. A system as in claim 11, wherein the database data comprises financial data.

15. A system as in claim 11, wherein the database data comprises product data.

16. A system as in claim 11, wherein the database data comprises service data.

17. A system as in claim 11, wherein the database data is associated with the requestor.

18. A system as in claim 11, wherein the database data is associated with a role associated with the requestor.

19. A system as in claim 11, wherein the database data is associated with a role associated with the requestor, wherein the role comprises one or more of the following: an executive role, an officer role, a director role, a manager role, a leader role, an assistant role, an administrator role, a consultant role, employee role, contingent worker role, a dependent role, a beneficiary role, a related person role, an external contact role, a security administrator role, an IT support person role, a HR recruiter role, a HR partner role, a group leader role, a facility access role, and a compensation partner role.

* * * * *